(12) United States Patent
Li et al.

(10) Patent No.: US 11,149,543 B2
(45) Date of Patent: Oct. 19, 2021

(54) DIGITAL BASEBAND COMMUNICATION ON POWER LINE DOWNHOLE

(71) Applicant: Halliburton Energy Services, Inc., Houston, TX (US)

(72) Inventors: Peng Li, Houston, TX (US); Wei Sun, Houston, TX (US); Xiang Tian, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 218 days.

(21) Appl. No.: 16/086,901

(22) PCT Filed: Dec. 7, 2017

(86) PCT No.: PCT/US2017/065097
§ 371 (c)(1),
(2) Date: Sep. 20, 2018

(87) PCT Pub. No.: WO2019/112588
PCT Pub. Date: Jun. 13, 2019

(65) Prior Publication Data
US 2020/0325768 A1    Oct. 15, 2020

(51) Int. Cl.
*E21B 47/13* (2012.01)
*H04B 3/54* (2006.01)

(52) U.S. Cl.
CPC ............ *E21B 47/13* (2020.05); *H04B 3/542* (2013.01); *H04B 3/548* (2013.01); *H04B 2203/5425* (2013.01); *H04B 2203/5475* (2013.01); *H04B 2203/5483* (2013.01)

(58) Field of Classification Search
CPC ............ H04B 2203/5483; H04B 3/542; G01V 11/002

USPC ....................................................... 340/854.6
See application file for complete search history.

(56) References Cited

U.S. PATENT DOCUMENTS

| 4,267,595 | A |   | 5/1981 | Hernandez |
| 4,665,531 | A |   | 5/1987 | Aly |
| 5,926,507 | A | * | 7/1999 | Shensa ................ H04L 27/3845 329/304 |

(Continued)

FOREIGN PATENT DOCUMENTS

| CN | 102255693 | 11/2011 |
| EP | 0419047   | 3/1991  |

(Continued)

OTHER PUBLICATIONS

International Patent Application No. PCT/US2017/065097, International Search Report and Written Opinion, dated Aug. 29, 2018, 23 pages.

*Primary Examiner* — Fabricio R Murillo Garcia
(74) *Attorney, Agent, or Firm* — Kilpatrick Townsend & Stockton LLP

(57) ABSTRACT

A communication system can include a first transceiver and a second transceiver that can communicate digital baseband data via a direct current (DC) power line bus in the wellbore. One or more of the transceivers includes a demodulator for demodulating the digital baseband data received from the DC power line bus into multiple digital data streams, and includes a digital processor for filtering and applying error correction to the digital data streams to produce a decoded digital data stream.

14 Claims, 4 Drawing Sheets

(56) References Cited

U.S. PATENT DOCUMENTS

| | | | |
|---|---|---|---|
| 6,282,714 B1* | 8/2001 | Ghori | G09G 5/006 725/81 |
| 7,183,900 B2 | 2/2007 | Sullivan | |
| 8,385,399 B2 | 2/2013 | Yang et al. | |
| 9,064,388 B1 | 6/2015 | Razazian et al. | |
| 2004/0157571 A1* | 8/2004 | Wortel | H04L 27/1563 455/131 |
| 2005/0003786 A1* | 1/2005 | Inoue | H03G 3/3084 455/263 |
| 2007/0069864 A1* | 3/2007 | Bae | H04B 5/02 340/10.2 |
| 2008/0219331 A1* | 9/2008 | Liang | H03M 3/376 375/219 |
| 2009/0066480 A1* | 3/2009 | Koo | G06K 7/10198 340/10.1 |
| 2012/0037354 A1* | 2/2012 | McCoy | G01V 11/002 166/65.1 |
| 2013/0215885 A1 | 8/2013 | Vijayasankar et al. | |
| 2015/0180589 A1 | 6/2015 | Schwager et al. | |
| 2015/0303710 A1* | 10/2015 | John | H02J 50/80 307/104 |
| 2016/0043802 A1* | 2/2016 | Suh | G02B 6/2938 398/141 |
| 2019/0341966 A1* | 11/2019 | Carter | H04B 3/542 |

FOREIGN PATENT DOCUMENTS

| | | |
|---|---|---|
| WO | 9221194 | 11/1992 |
| WO | 2014194103 | 12/2014 |

\* cited by examiner

DIGITAL BASEBAND COMMUNICATION ON POWER LINE DOWNHOLE

TECHNICAL FIELD

The present disclosure relates generally to devices for use in wellbores. More specifically, but not by way of limitation, this disclosure relates to methods and systems for communicating digital baseband data between devices downhole in a wellbore.

BACKGROUND

A well (e.g., an oil or gas well for extracting fluid or gas from a subterranean formation) can include various tools, such as sensors and functional devices. The tools may communicate with each other and devices at the surface of the wellbore through transceivers and a communication medium. For example, a well system can include sensors for measuring well system parameters, such as temperature, pressure, resistivity, or sound levels. One sensor can transmit data to another sensor, which can transmit the data to a well operator device at the surface. In a downhole environment, there is a harsh conditions (e.g., high temperature) and space constraints, among other characteristics, which can negatively impact the ability of tools to communicate with each other.

DETAILED DESCRIPTION

Figure 1:
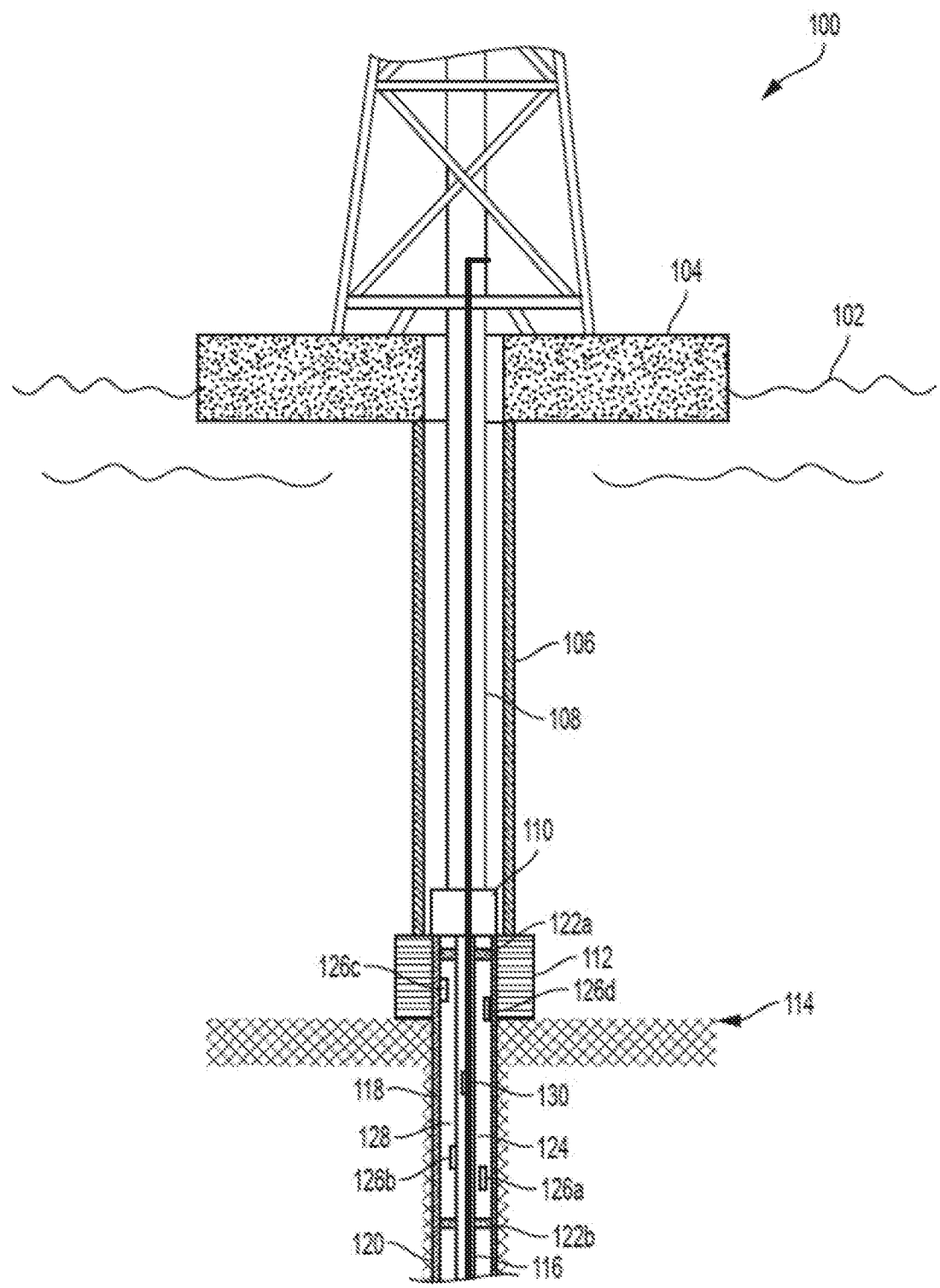
FIG. 1 is a cross-sectional view of an example of a well system that can include a communication system in a downhole environment for transceiving digital baseband signals via a power line bus according to some aspects.

Certain aspects and features of the present disclosure relate to a downhole communication system that can use a direct current (DC) power line as a communication medium transmitting digital baseband data between devices that can implement demodulation and digital processing processes to improve data rates, reduce data errors, and improve communication. A demodulator can be included in a device and can demodulate received digital baseband data into two or more digital data streams. For example, the demodulator can include two or more channels that each have inherent hysteresis and a triggering point at different levels used to form the digital data streams from the digital baseband data. A processor device can filter and apply error correction to the digital data streams to produce a decided digital data stream.

A power line communication (PLC) system can use electrical wiring to simultaneously carry both data and electric power. A digital baseband PLC system according to some examples can use a coupling media to modulate changing digital signals directly onto the power line bus. The power line bus may be a single pair of wires to deliver both power and communications, which can help reduce the space needed for communications in space-constrained environments, such as downhole in a wellbore. Ringing after sharp digital transitions and noise on the power line bus can corrupt the data and diminish the performance of the communication system. For example, the communication system may need to operate at a low data transfer rate to reduce the chance of noise and ringing from preventing data and communication transfer. Control over impedance matching and parasitics can be difficult in PLC systems due to power delivery and system grounding requirements. For long distance and high-speed PLC systems, reflections and sharp digital transition rings can disrupt normal signal transmissions and can result in failed communications. Furthermore, noise on the power line can add on to digital data and make it more difficult to decode the digital data. And signals and ringing can change with loads, speeds, and the number of connected devices in the system, which can also make it more difficult to decode the digital data.

A communication system according to some examples can include a hysteresis demodulator and a digital processor, such as a field-programmable gate array (FPGA), to detect and correct communication errors on the fly, which can increase the speed and robustness performance of the communication system. For example, digital data received downhole from a power line bus can be demodulated into multiple digital data streams by different hysteresis comparators that are more sensitive to some types of digital data than other types. The digital data streams can be filtered and corrected by a digital processor to decode the digital data faster and more accurately.

By using a digital baseband communication system with a PLC system for communications between devices downhole, space needed for the components can be reduced. For example, an additional communication medium is not needed and complex components using high power for processing non-baseband data signals can be excluded.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that can include a communication system in a downhole environment for transceiving digital baseband signals via a power line bus according to some aspects. The well system 100 includes a platform 104. In some examples, the platform 104 can be a floating rig or a vessel positioned at the sea surface 102. A riser 106 can extend from the platform 104 to a subsea tree 112. The subsea tree 112 can be positioned at the sea floor 114. The riser 106 can include a tubular 108 (e.g., a landing string). The tubular 108 can extend from the platform 104 to the subsea tree 112. In some examples, a well operator can use the tubular 108 to communicate fluid, power, well tools, and other well components between the sea surface 102 and the sea floor 114.

The subsea tree 112 can include ports, valves, and flow lines for controlling fluid flow through the well system 100. In some examples, the subsea tree 112 can control the flow of fluid through a tubular 116 (e.g., a production tube) positioned in a wellbore 120 (e.g., below the sea floor 114). The tubular 116 can be positioned in the wellbore 120 for extracting hydrocarbons from the wellbore 120. In other examples, the subsea tree 112 can control the flow of fluid from the tubular 116 to other well tools in the well system 100. For example, the subsea tree 112 can control the flow of fluid from the tubular 116 to other well tools positioned on the sea floor 114. In some examples, the subsea tree 112 can include or otherwise be coupled to a subsea control system 110 for controlling the subsea tree 112.

The wellbore 120 can include a casing string 118. The casing string 118 can be positioned in the wellbore 120 for preventing the walls of the wellbore 120 from collapsing.

In some examples, multiple transceivers 126a-d can be randomly, sequentially, or otherwise positioned in a space 124 between an outer housing of the tubular 116 and an inner housing of the casing string 118. The transceivers 126a-d can communicate data (e.g., sensor data) among one another via a power line bus 130 that extends through the length of the well system 100 to provide power from a power source (not shown) to components, include the transceivers 126a-d, in the wellbore.

In some examples, the transceivers 126a-d can be coupled to the tubular 116, to the casing string 118, or both. In some examples, each of the transceivers 126a-d can include one or more sensors. The sensor can detect a characteristic of a transceiver 126a-d, a characteristic of a well tool, a characteristic an environment in a wellbore, or any combination of these. Examples of the sensors can include a temperature sensor, pressure sensor, vibration sensor, acoustic sensor (e.g., a microphone), strain gauge, flow sensor, tilt sensor, accelerometer, gyroscope, inclinometer, or any combination of these. Each of the transceivers 126a-d can gather data (e.g., in real time) via a respective sensor and transmit the data to another transceiver 126a-d. In other examples, the transceivers 126a-d are associated with tools and exchange data for controlling the tools. One of the transceivers 126a-d may be a master transceiver that communicates via any suitable form or protocol with components at the surface of the well system 100. The other transceivers 126a-d may be slave transceivers that form a mesh network for conveying data and information from one transceiver to the master transceiver for retransmission to the surface component.

Although depicted and described as a subsea well system 100, in other examples the well system is a terrestrial well system that can take multiple forms. In addition, the distances between each of the transceivers 126a-d may be significantly larger than that which is represented in FIG. 1. That is, FIG. 1 is not drawn to scale.

Figure 2:
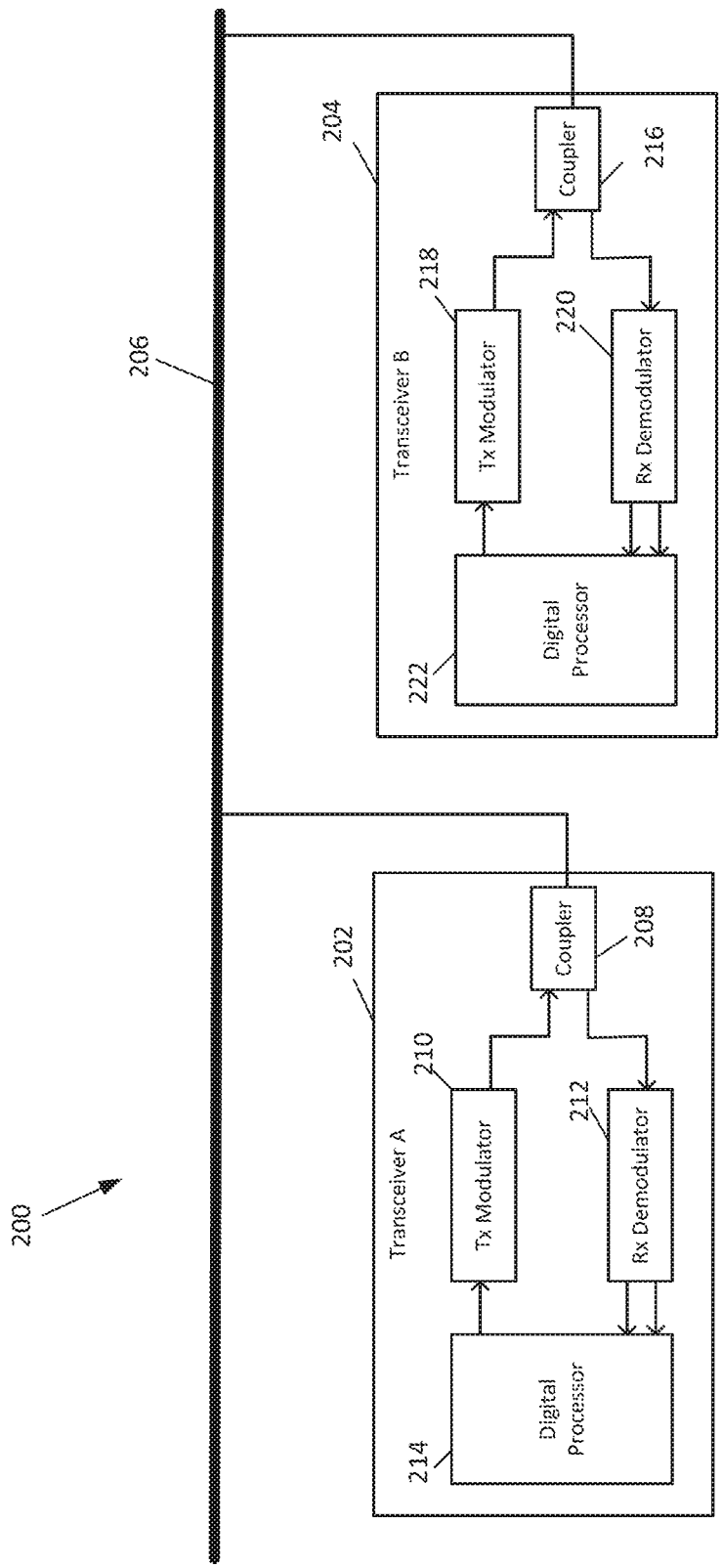
FIG. 2 is a schematic block diagram of a communication system that can be used to communicate among devices downhole in a wellbore according to some aspects.

FIG. 2 is a schematic block diagram of a communication system 200 that can be used to communicate among devices downhole in a wellbore according to one example. The communication system 200 can be used to communicate digital baseband data between transceivers 202, 204 via a power line bus 206 in the wellbore. The power line bus 206 can be a DC power line bus that includes a pair of wires that can carry power for tools in the wellbore, but that can also carry digital baseband data.

Included in transceiver A 202 is a coupler 208, a transmit modulator 210, a receive demodulator 212, and a digital processor 214. Transceiver B 204 can include similar elements, such as a coupler 216, transmit modulator 218, receive demodulator 220, and digital processor 222. In other examples, transceiver A 202 or transceiver B 204 can include different types of components as compared to the other transceiver.

The couplers 208, 216 can couple the transceivers 202, 204 to the power line bus 206 for receiving and transmitting digital baseband data via the power line bus 206. Examples of the couplers 208, 216 include capacitive couplers and inductive couplers. The transmit modulators 210, 218 can modulate data from the digital processors 214, 222 into digital baseband data form for transmission via the couplers 208, 216 to the power line bus 206. The receive demodulators 212, 220 can receive digital baseband data from the power line bus 206 via the couplers 208, 216 and demodulate the digital baseband data. In some examples, one or both of the receive demodulators 212, 220 are dual hysteresis demodulators that can be used to mitigate the ringing and noise issues that may be present in the communication system.

The receive demodulators 212, 220 can demodulate the digital baseband data into multiple digital data streams that are provided to the digital processors 214, 222 (as represented by the multiple arrows between receive demodulators 212, 220 and the digital processors 214, 222). By providing multiple digital data streams that represent the same digital baseband data received from the power line bus 206, communication errors can be corrected or reduced on the fly. The digital processors 214, 222 can filter the digital data streams and apply error correction to the digital data streams, to produce a decoded digital data stream. Examples of the digital processors 214, 222 include FPGAs. The decoded digital data stream can be used by the digital processors 214, 222 to control a tool or provide the data to another device. The digital processors 214, 222 can also encode data and control the transmit modulators 210, 218 to generate modulated signals.

Figure 3:
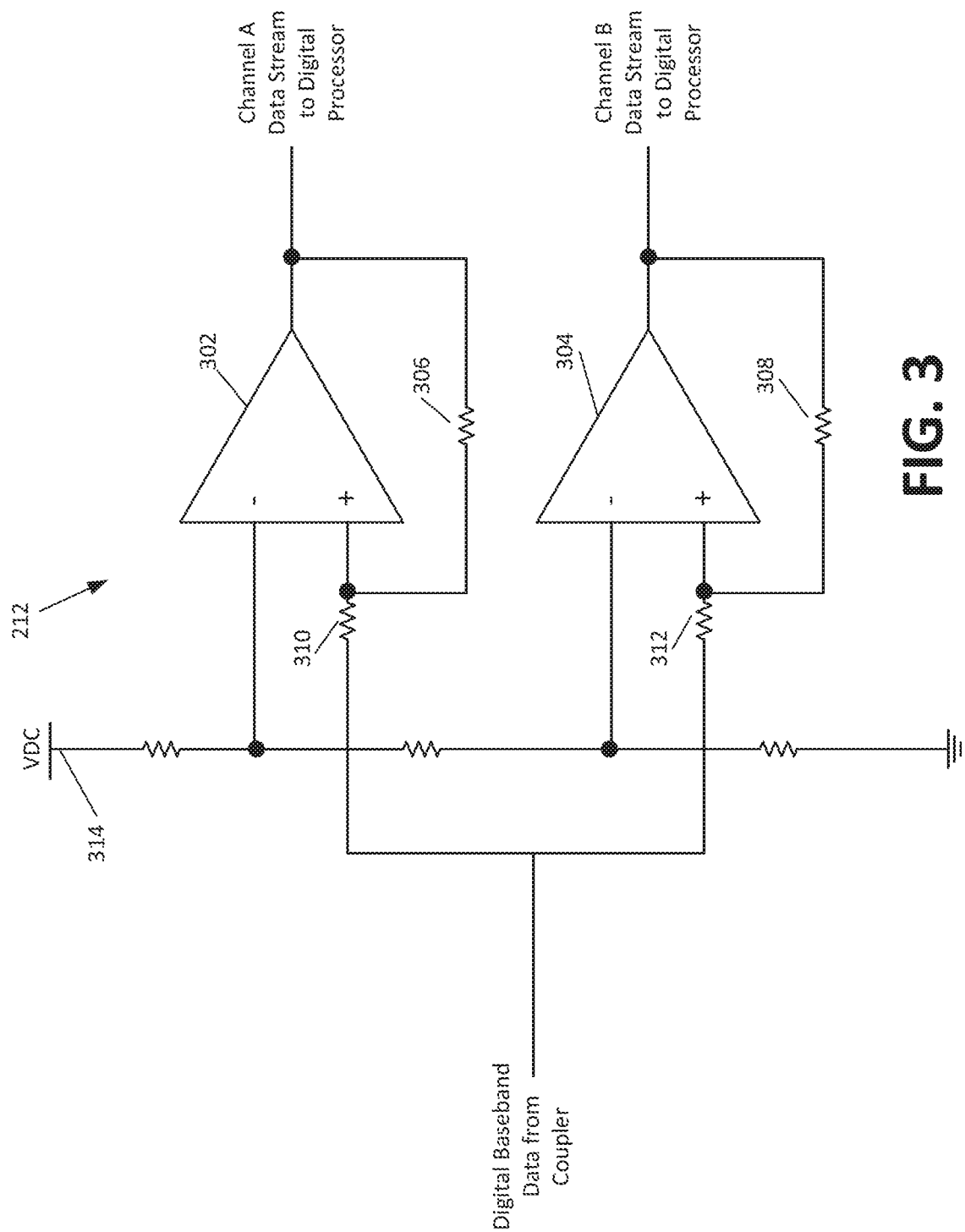
FIG. 3 is a schematic diagram of a receive demodulator according to some aspects.

FIG. 3 is a schematic diagram of a receive demodulator, such as receive demodulator 212 from FIG. 2, according to one example. The receive demodulator 212 includes dual comparators 302, 304 that can form hysteresis circuitry to provide, in different channels, multiple digital data streams from digital baseband data received from a coupler. For example, comparator 302 can provide a digital data stream in channel A to a digital processor and comparator 304 can provide a digital data stream in channel B to the digital processor. Although two channels are illustrated, any number of channels greater than one can be used.

The comparators 302, 304 can be associated with different triggering points that are more or less sensitive to positive and negative digital baseband data. For example, comparator 302 can be associated with a triggering point at a level that is set such that the comparator 302 is more sensitive to positive portions of the digital baseband data than to negative portions of the digital baseband data. And comparator 304 can be associated with a triggering point at a different level that is set such that the comparator 304 is more sensitive to negative portions of the digital baseband data than to positive portions of the digital baseband data. The comparator 302, 304 can, in effect, filter the digital baseband data for noise and pass digital data streams that exceed a hysteresis loop trigger. For example, the comparator 302 can form a first hysteresis loop and pass signal changes that exceed the hysteresis loop level and prevent other signals from passing, while the other comparator 304 can form a second hysteresis loop that performs a similar function at a different trigger point. When the signal changes, both comparators 302, 304 can generate respective parts of the demodulated signals, with one signal covering the other one. For rings and noises that exceed one of the hysteresis loops, only one of the comparators 302, 304 may be triggered since the other comparator covers a different region. The results from the comparators 302, 304 can be combined in the digital processor and decoded to produce a decoded signal.

The triggering point can be set by values of resistors associated with each of the comparators 302, 304. For example, resistors 306, 308 are feedback resistors and those, along with resistors 310, 312, can have resistive values that control the triggering points for the comparators 302, 304. Examples of values for resistors 306, 310 can be 360 kΩ and 20 kΩ for setting a triggering point that is more sensitive to positive portions of the digital baseband data. Examples of values for resistors 308, 312 can be 240 kΩ and 20 kΩ for setting a triggering point that is more sensitive to negative portions of the digital baseband data. Voltage source 314 (along with the associated resistor network) can provide a voltage level for the comparators 302, 304 for comparing the digital baseband data.

Figure 4:
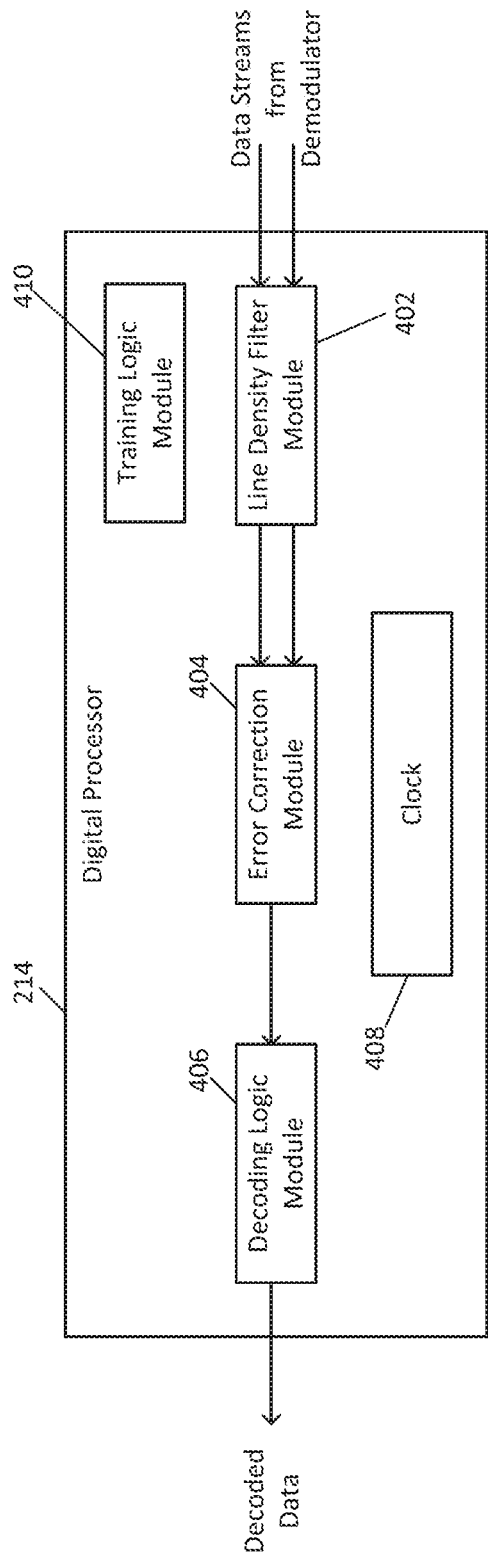
FIG. 4 is a block diagram of a digital processor according to some aspects.

FIG. 4 is a block diagram of a digital processor, such as digital processor 214 from FIG. 2, according to one example. Digital processor 214 may be an FPGA that includes programmable logic blocks in a non-transitory computer-readable medium in an integrated circuit and that are executable to accomplish tasks. Examples of the programmable logic blocks are shown in FIG. 4 and include a line density filter module 402, an error correction module 404, a decoding logic module 406, a clock 408, and a training logic module 410.

Multiple data streams (represented by two arrows) can be received from a demodulator by the line density filter module 402. The line density filter module 402 can filter the digital data streams based on one or more characteristics of the power line bus from which the digital baseband data is received. For example, the training logic module 410 can be executed in an initial set-up phase to determine a filtering coefficient to be used by the line density filter module 402. The training logic module 410 can output fixed training patterns from the top of a wellbore to the bottom, receive the fixed patterns, and analyze the data to identify characteristics of the power line bus. For example, the data can be analyzed to determine how much attenuation that the power line bus applies to the communication signals. The training logic module 410 can be used to identify known issues (e.g., negative effects on communication signals that the communication system normally applies) and the filtering coefficient of the line density filter module 402 can be set to account for those known issues. In some examples, the line density filter module 402 can check the densities of value active durations in the data streams based on the clock timings from the clock 408, and remove any remaining ringing and noise bounces to generate smooth digital outputs.

The filtered data streams can be provided to the error correction module 404. The error correction module 404 can perform a second layer, error-correction process on the signals and output a single data stream that has been filtered and corrected. In some examples, the error correction module 404 can compare the digital data streams to an encoding protocol and correct the signals on the fly by removing, or not using, the signals not complying with the encoding protocol. The encoding protocol may be a bipolar encoding protocol that has specific encoding patterns and the digital data streams can be compared to the encoding patterns to determine which data stream contains noises and from which data stream that data at specific instances is used in the single data stream. The encoding protocol can be stored in the digital processor 214 and accessed by the error correction module 404 for use in compared to the digital data streams. For example, for bipolar return to zero (RZ) encoding, two non-zero values of positive and negative can be used in addition to the zero value. A digital zero can be translated as a zero on the power line bus, and a digital one can be translated as alternating positive and negative on the power line bus. The error correction module 404 can detect illegal states (e.g., non-alternating states) and identify if it a low frequency DC shift on the bus (e.g., represented by elongated digital one from both comparators). Once identify, the error correction module 404 can insert a delay into the decoding logic to wait until the low frequency transient finishes before the digital processor 214 actively decodes again. This can prevent the digital processor 214 from mistriggering. If small elongated positive or negative transients occur during an active transmission, the error correction module 404 can correct the error into its normal state (e.g., zero).

The single data stream from the error correction module 404 can be provided to the decoding logic module 406. The decoding logic module 406 can perform decoding on the single data stream in accordance with a decoding protocol to determine the data. In some examples, the decoding logic module 406 performs bipolar decoding on the single data stream.

The clock 408 may be a baud generator that outputs a clock signal that can be used to coordinate with the other transceiver on a data rate by which to exchange data.

By using dual comparators for demodulation and digital processing filtering and error correction, data can be exchanged between devices at higher speeds than other systems (in some cases the data exchange rate may be ten times higher than existing systems) at very long distance (e.g., 150-foot power lines).

In some aspects, systems are methods for digital baseband communications over power line in a downhole environment are provided according to one or more of the following examples. As used below, any reference to a series of examples is to be understood as a reference to each of those examples disjunctively (e.g., "Examples 1 to 4" is to be understood as "Examples 1, 2, 3, or 4").

Example 1 is a communication system comprising: a first transceiver positionable in a wellbore for transmitting digital baseband data via a direct current (DC) power line bus in the wellbore; and a second transceiver positionable in the wellbore and comprising: a demodulator for demodulating the digital baseband data received from the DC power line bus into a plurality of digital data streams; and a digital processor for filtering and applying error correction to the plurality of digital data streams to produce a decoded digital data stream.

Example 2 is the communication system of example 1, wherein the digital processor includes code that is executable by the digital processor, the code comprising: a line density filter module that is executable for filtering the plurality of digital data streams based on one or more characteristics of the DC power line bus; an error correction module that is executable to correct digital data in the plurality of digital data streams according to an encoding protocol to form a digital data stream; and a decoding logic module that is executable to decode the digital data stream into the decoded digital data stream.

Example 3 is the communication system of example 2, wherein the digital processor is a field-programmable gate array (FPGA) that further includes: a clock that is usable to coordinate data rate exchanges with the first transceiver; and a training logic module that is executable in a system set-up phase to determine a coefficient used by the line density filter module to filter the plurality of digital data streams, wherein the second transceiver further comprises: a modulator for modulating data from the FPGA into second digital baseband data for transmission via the DC power line bus; and a coupler for communicatively coupling the demodulator and the modulator to the DC power line bus.

Example 4 is the communication system of example 1, wherein the demodulator includes hysteresis circuitry comprising: a first comparator associated with a first triggering point at a first level for providing a first digital data stream of the plurality of digital data streams in a first channel; and a second comparator associated with a second trigger point at a second level that is different than the first level for providing a second digital data stream of the plurality of digital data streams in a second channel.

Example 5 is the communication system of example 4, wherein the first triggering point at the first level is set such that the first comparator is more sensitive to positive portions of the digital baseband data than to negative portions of the digital baseband data, wherein the second triggering point at the second level is set such that the second comparator is more sensitive to negative portions of the digital baseband data than to positive portions of the digital baseband data.

Example 6 is the communication system of example 5, wherein the hysteresis circuity is configured to filter the digital baseband data for noise and pass digital data streams of the plurality of digital data streams that exceed a hysteresis loop trigger.

Example 7 is the communication system of example 1, wherein the first transceiver comprises: a first transceiver demodulator for demodulating a digital baseband data signal received from the DC power line bus into a plurality of second digital data streams; and a first transceiver digital processor for filtering and applying error correction to the plurality of second digital data streams to produce a decoded second digital data stream.

Example 8 is a transceiver device, comprising: a coupler for communicatively coupling the transceiver device to a direct current (DC) power line bus downhole in a wellbore to communicate digital baseband data with a second transceiver device positionable in the wellbore with the transceiver device and the DC power line bus; a demodulator for demodulating the digital baseband data received from the DC power line bus into a plurality of digital data streams; and a digital processor for filtering and applying error correction to the plurality of digital data streams to produce a decoded digital data stream.

Example 9 is the transceiver device of example 8, wherein the digital processor includes code that is executable by the digital processor, the code comprising: a line density filter module that is executable for filtering the plurality of digital data streams based on one or more characteristics of the DC power line bus; an error correction module that is executable to correct digital data in the plurality of digital data streams according to an encoding protocol to form a digital data stream; and a decoding logic module that is executable to decode the digital data stream into the decoded digital data stream.

Example 10 is the transceiver device of example 9, wherein the digital processor is a field-programmable gate array (FPGA) that further includes: a clock that is usable to coordinate data rate exchanges with the second transceiver device; and a training logic module that is executable in a system set-up phase to determine a coefficient used by the line density filter module to filter the plurality of digital data streams, wherein the transceiver device further comprises a modulator for modulating data from the FPGA into second digital baseband data for transmission via the DC power line bus.

Example 11 is the transceiver device of example 8, wherein the demodulator includes hysteresis circuitry comprising: a first comparator associated with a first triggering point at a first level for providing a first digital data stream of the plurality of digital data streams in a first channel; and a second comparator associated with a second trigger point at a second level that is different than the first level for providing a second digital data stream of the plurality of digital data streams in a second channel.

Example 12 is the transceiver device of example 11, wherein the first triggering point at the first level is set such that the first comparator is more sensitive to positive portions of the digital baseband data than to negative portions of the digital baseband data, wherein the second triggering point at the second level is set such that the second comparator is more sensitive to negative portions of the digital baseband data than to positive portions of the digital baseband data.

Example 13 is the transceiver device of example 12, wherein the hysteresis circuity is configured to filter the digital baseband data for noise and pass digital data streams of the plurality of digital data streams that exceed a hysteresis loop trigger.

Example 14 is the transceiver device of example 8, wherein the coupler is a capacitive coupler or an inductive coupler.

Example 15 is a method comprising: receiving, by a first transceiver and from a direct current (DC) power line bus in a wellbore, digital baseband data transmitted by a second transceiver in the wellbore; demodulating the digital baseband data received from the DC power line bus into a plurality of digital data streams; filtering, by a digital processor, the plurality of digital data streams and applying, by the digital processor, error correction to the plurality of digital data streams, to produce a decoded digital data stream.

Example 16 is the method of example 15, wherein filtering the plurality of digital data streams includes the digital processor executing a line density filter module to filter the plurality of digital data streams based on one or more characteristics of the DC power line bus, wherein applying error correction to the plurality of digital data streams includes the digital processor executing an error correction module to correct digital data in the plurality of digital data streams according to an encoding protocol to form a digital data stream, the method further comprising: executing, by the digital processor, a decoding logic module to decode the digital data stream into the decoded digital data stream.

Example 17 is the method of example 15, further comprising: modulating data from the digital processor into second digital baseband data for transmission via the DC power line bus.

Example 18 is the method of example 15, wherein demodulating the digital baseband data received from the DC power line bus into the plurality of digital data streams comprises: providing, in a first channel by a first comparator having a first triggering point at a first level, a first digital data stream of the plurality of digital data streams; providing, in a second channel by a second comparator having a second triggering point at a second level, a second digital data stream of the plurality of digital data streams.

Example 19 is the method of example 18, wherein the first triggering point at the first level is set such that the first comparator is more sensitive to positive portions of the digital baseband data than to negative portions of the digital baseband data, wherein the second triggering point at the second level is set such that the second comparator is more sensitive to negative portions of the digital baseband data than to positive portions of the digital baseband data.

Example 20 is the method of example 15, wherein demodulating the digital baseband data received from the DC power line bus into the plurality of digital data streams comprises: hysteresis circuitry of a demodulator filtering the digital baseband data for noise and passing digital data streams of the plurality of digital data streams that exceed a hysteresis loop trigger.

Example 21 is a communication system, comprising: a first transceiver device, comprising: a coupler for communicatively coupling the first transceiver device to a direct current (DC) power line bus downhole in a wellbore to communicate digital baseband data with a second transceiver device positionable in the wellbore with the first transceiver device and the DC power line bus; a demodulator for demodulating the digital baseband data received from the DC power line bus into a plurality of digital data streams; and a digital processor for filtering and applying error correction to the plurality of digital data streams to produce a decoded digital data stream.

Example 22 is the communication system of example 21, further comprising the second transceiver device.

Example 23 is the communication system of examples 21 or 22, wherein the digital processor includes code that is executable by the digital processor, the code comprising: a line density filter module that is executable for filtering the plurality of digital data streams based on one or more characteristics of the DC power line bus; an error correction module that is executable to correct digital data in the plurality of digital data streams according to an encoding protocol to form a digital data stream; and a decoding logic module that is executable to decode the digital data stream into the decoded digital data stream.

Example 24 is the communication system of any of examples 21 to 23, wherein the digital processor is a field-programmable gate array (FPGA) that further includes: a clock that is usable to coordinate data rate exchanges with the second transceiver device; and a training logic module that is executable in a system set-up phase to determine a coefficient used by the line density filter module to filter the plurality of digital data streams, wherein the first transceiver device further comprises: a modulator for modulating data from the FPGA into second digital baseband data for transmission via the DC power line bus; and a coupler for communicatively coupling the demodulator and the modulator to the DC power line bus.

Example 25 is the communication system of any of examples 21 to 24, wherein the demodulator includes hysteresis circuitry comprising: a first comparator associated with a first triggering point at a first level for providing a first digital data stream of the plurality of digital data streams in a first channel; and a second comparator associated with a second trigger point at a second level that is different than the first level for providing a second digital data stream of the plurality of digital data streams in a second channel.

Example 26 is the communication system of example 25, wherein the first triggering point at the first level is set such that the first comparator is more sensitive to positive portions of the digital baseband data than to negative portions of the digital baseband data, wherein the second triggering point at the second level is set such that the second comparator is more sensitive to negative portions of the digital baseband data than to positive portions of the digital baseband data.

Example 27 is the communication system of examples 25 or 26, wherein the hysteresis circuity is configured to filter the digital baseband data for noise and pass digital data streams of the plurality of digital data streams that exceed a hysteresis loop trigger.

Example 28 is the communication system of any of examples 21 to 27, wherein the second transceiver device comprises: a second transceiver demodulator for demodulating a digital baseband data signal received from the DC power line bus into a plurality of second digital data streams; and a second transceiver digital processor for filtering and applying error correction to the plurality of second digital data streams to produce a decoded second digital data stream.

Example 29 is a method comprising: receiving, by a first transceiver and from a direct current (DC) power line bus in a wellbore, digital baseband data transmitted by a second transceiver in the wellbore; demodulating the digital baseband data received from the DC power line bus into a plurality of digital data streams; filtering, by a digital processor, the plurality of digital data streams and applying, by the digital processor, error correction to the plurality of digital data streams, to produce a decoded digital data stream.

Example 30 is the method of example 29, wherein filtering the plurality of digital data streams includes the digital processor executing a line density filter module to filter the plurality of digital data streams based on one or more characteristics of the DC power line bus, wherein applying error correction to the plurality of digital data streams includes the digital processor executing an error correction module to correct digital data in the plurality of digital data streams according to an encoding protocol to form a digital data stream.

Example 31 is the method of examples 29 or 30, further comprising: executing, by the digital processor, a decoding logic module to decode the digital data stream into the decoded digital data stream.

Example 32 is the method of any of examples 29 to 31, further comprising: modulating data from the digital processor into second digital baseband data for transmission via the DC power line bus.

Example 33 is the method of any of examples 29 to 32, wherein demodulating the digital baseband data received from the DC power line bus into the plurality of digital data streams comprises: providing, in a first channel by a first comparator having a first triggering point at a first level, a first digital data stream of the plurality of digital data streams; providing, in a second channel by a second comparator having a second triggering point at a second level, a second digital data stream of the plurality of digital data streams.

Example 34 is the method of example 33, wherein the first triggering point at the first level is set such that the first comparator is more sensitive to positive portions of the digital baseband data than to negative portions of the digital baseband data, wherein the second triggering point at the second level is set such that the second comparator is more sensitive to negative portions of the digital baseband data than to positive portions of the digital baseband data.

Example 35 is the method of any of examples 29 to 35, wherein demodulating the digital baseband data received from the DC power line bus into the plurality of digital data streams comprises: hysteresis circuitry of a demodulator filtering the digital baseband data for noise and passing digital data streams of the plurality of digital data streams that exceed a hysteresis loop trigger.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A communication system comprising:
   a first transceiver positionable in a wellbore for transmitting digital baseband data via a direct current (DC) power line bus in the wellbore; and
   a second transceiver positionable in the wellbore and comprising:
      a demodulator for demodulating, using hysteresis circuitry comprising a plurality of comparators, the digital baseband data received from the DC power line bus into a plurality of digital data streams;
      a first comparator of the plurality of comparators associated with a first triggering point at a first level for providing a first digital data stream of the plurality of digital data streams in a first channel, wherein the first triggering point at the first level is set such that the first comparator is more sensitive to positive portions of the digital baseband data than to negative portions of the digital baseband data;
      a second comparator of the plurality of comparators associated with a second triggering point at a second level that is different than the first level for providing a second digital data stream of the plurality of data streams in a second channel, wherein the second triggering point at the second level is set such that the second comparator is more sensitive to negative portions of the digital baseband data than to positive portions of the digital baseband data; and
      a digital processor for filtering and applying error correction to the plurality of digital data streams to produce a decoded digital data stream.

2. The communication system of claim 1, wherein the digital processor includes code that is executable by the digital processor, the code comprising:
   a line density filter module that is executable for filtering the plurality of digital data streams based on one or more characteristics of the DC power line bus;
   an error correction module that is executable to correct digital data in the plurality of digital data streams according to an encoding protocol to form a digital data stream; and
   a decoding logic module that is executable to decode the digital data stream into the decoded digital data stream.

3. The communication system of claim 2, wherein the digital processor is a field-programmable gate array (FPGA) that further includes:
   a clock that is usable to coordinate data rate exchanges with the first transceiver; and
   a training logic module that is executable in a system set-up phase to determine a coefficient used by the line density filter module to filter the plurality of digital data streams,
   wherein the second transceiver further comprises:
      a modulator for modulating data from the FPGA into second digital baseband data for transmission via the DC power line bus; and
      a coupler for communicatively coupling the demodulator and the modulator to the DC power line bus.

4. The communication system of claim 1, wherein the hysteresis circuitry is configured to filter the digital baseband data for noise and pass digital data streams of the plurality of digital data streams that exceed a hysteresis loop trigger.

5. The communication system of claim 1, wherein the first transceiver comprises:
   a first transceiver demodulator for demodulating a digital baseband data signal received from the DC power line bus into a plurality of second digital data streams; and
   a first transceiver digital processor for filtering and applying error correction to the plurality of second digital data streams to produce a decoded second digital data stream.

6. A transceiver device, comprising:
   a coupler for communicatively coupling the transceiver device to a direct current (DC) power line bus downhole in a wellbore to communicate digital baseband data with a second transceiver device positionable in the wellbore with the transceiver device and the DC power line bus;
   a demodulator for demodulating, using hysteresis circuitry comprising a plurality of comparators, the digital baseband data received from the DC power line bus into a plurality of digital data streams;
   a first comparator of the plurality of comparators associated with a first triggering point at a first level for providing a first digital data stream of the plurality of digital data streams in a first channel, wherein the first triggering point at the first level is set such that the first comparator is more sensitive to positive portions of the digital baseband data than to negative portions of the digital baseband data;
   a second comparator of the plurality of comparators associated with a second triggering point at a second level that is different than the first level for providing a second digital data stream of the plurality of data streams in a second channel, wherein the second triggering point at the second level is set such that the second comparator is more sensitive to negative portions of the digital baseband data than to positive portions of the digital baseband data; and
   a digital processor for filtering and applying error correction to the plurality of digital data streams to produce a decoded digital data stream.

7. The transceiver device of claim 6, wherein the digital processor includes code that is executable by the digital processor, the code comprising:
   a line density filter module that is executable for filtering the plurality of digital data streams based on one or more characteristics of the DC power line bus;
   an error correction module that is executable to correct digital data in the plurality of digital data streams according to an encoding protocol to form a digital data stream; and
   a decoding logic module that is executable to decode the digital data stream into the decoded digital data stream.

8. The transceiver device of claim 7, wherein the digital processor is a field-programmable gate array (FPGA) that further includes:
   a clock that is usable to coordinate data rate exchanges with the second transceiver device; and
   a training logic module that is executable in a system set-up phase to determine a coefficient used by the line density filter module to filter the plurality of digital data streams, wherein the transceiver device further comprises a modulator for modulating data from the FPGA into second digital baseband data for transmission via the DC power line bus.

9. The transceiver device of claim 6, wherein the hysteresis circuitry is configured to filter the digital baseband data for noise and pass digital data streams of the plurality of digital data streams that exceed a hysteresis loop trigger.

10. The transceiver device of claim 6, wherein the coupler is a capacitive coupler or an inductive coupler.

11. A method comprising:
receiving, by a first transceiver and from a direct current (DC) power line bus in a wellbore, digital baseband data transmitted by a second transceiver in the wellbore;
demodulating, using hysteresis circuitry comprising a plurality of comparators, the digital baseband data received from the DC power line bus into a plurality of digital data streams comprising;
providing, in a first channel by a first comparator of the plurality of comparators having a first triggering point at a first level, a first digital data stream of the plurality of data streams, wherein the first triggering point at the first level is set such that the first comparator is more sensitive to positive portions of the digital baseband data than to negative portions of the digital baseband data;
providing, in a second channel by a second comparator of the plurality of comparators having a second triggering point at a second level, a second digital data stream of the plurality of data streams, wherein the second triggering point at the second level is set such that the second comparator is more sensitive to negative portions of the digital baseband data than to positive portions of the digital baseband data; and
filtering, by a digital processor, the plurality of digital data streams and applying, by the digital processor, error correction to the plurality of digital data streams, to produce a decoded digital data stream.

12. The method of claim 11, wherein filtering the plurality of digital data streams includes the digital processor executing a line density filter module to filter the plurality of digital data streams based on one or more characteristics of the DC power line bus,
wherein applying error correction to the plurality of digital data streams includes the digital processor executing an error correction module to correct digital data in the plurality of digital data streams according to an encoding protocol to form a digital data stream, the method further comprising:
executing, by the digital processor, a decoding logic module to decode the digital data stream into the decoded digital data stream.

13. The method of claim 11, further comprising:
modulating data from the digital processor into second digital baseband data for transmission via the DC power line bus.

14. The method of claim 11, wherein demodulating the digital baseband data received from the DC power line bus into the plurality of digital data streams comprises:
hysteresis circuitry of a demodulator filtering the digital baseband data for noise and passing digital data streams of the plurality of digital data streams that exceed a hysteresis loop trigger.

* * * * *